(12) United States Patent
Schneider et al.

(10) Patent No.: US 12,196,294 B2
(45) Date of Patent: Jan. 14, 2025

(54) CRANK DEVICE

(71) Applicant: Robert Bosch GmbH, Stuttgart (DE)

(72) Inventors: Juergen Schneider, Wiesen (DE);
Sebastian Amend, Aura (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/263,775

(22) PCT Filed: Feb. 7, 2022

(86) PCT No.: PCT/EP2022/052810
§ 371 (c)(1),
(2) Date: Aug. 1, 2023

(87) PCT Pub. No.: WO2022/171552
PCT Pub. Date: Aug. 18, 2022

(65) Prior Publication Data
US 2024/0068551 A1 Feb. 29, 2024

(30) Foreign Application Priority Data

Feb. 12, 2021 (DE) .................. 10 2021 201 317.1

(51) Int. Cl.
*F16H 33/06* (2006.01)
(52) U.S. Cl.
CPC .................. *F16H 33/06* (2013.01)
(58) Field of Classification Search
CPC .......... F16H 33/00; F16H 33/06; F16H 19/04; F16H 19/06; F16H 35/00; F16H 21/38; B62M 3/00
USPC ......................................................... 74/33
See application file for complete search history.

(56) References Cited

U.S. PATENT DOCUMENTS 6,981,483 B1 * 1/2006 Keip ............... F16H 19/043
123/197.1
8,365,620 B2 * 2/2013 Haka .................. F01B 9/047
74/33

FOREIGN PATENT DOCUMENTS

| CH | 65013 A | 5/1914 |
|---|---|---|
| DE | 30 20 719 A1 | 12/1981 |
| DE | 10 2011 011 313 B3 | 6/2012 |
| DE | 10 2019 117 110 A1 | 12/2020 |
| FR | 1 058 605 A | 3/1954 |
| WO | 03/000542 A1 | 1/2003 |

OTHER PUBLICATIONS

International Search Report corresponding to PCT Application No. PCT/EP2022/052810, mailed Apr. 20, 2022 (German and English language document) (6 pages).

* cited by examiner

*Primary Examiner* — T. Scott Fix
(74) *Attorney, Agent, or Firm* — Maginot, Moore & Beck LLP

(57) ABSTRACT

A crank device or crank drive is disclosed which has a crankshaft, into which a variable first force can be introduced by way of a transmission element over a variable first lever spacing. Here, the first variable force has a predefined profile and/or predefined change. A profile of the first variable lever spacing is designed in a manner which is dependent on the predefined profile of the first variable force in such a way that an effect of change in the first variable force on the crankshaft is at least partially compensated for. The compensation is provided over a rotational range of the crankshaft, which is preferably less than one revolution of the crankshaft.

9 Claims, 4 Drawing Sheets

CRANK DEVICE

This application is a 35 U.S.C. § 371 National Stage Application of PCT/EP2022/052810, filed on Feb. 7, 2022, which claims the benefit of priority to Serial No. DE 10 2021 201 317.1, filed on Feb. 12, 2021 in Germany, the disclosures of which are incorporated herein by reference in their entirety.

The disclosure relates to a crank device or a crank drive for converting a force into a torque.

BACKGROUND

Various cranks are known from the prior art, which convert a translational or linear force into a torque. Thus, for example, pedal cranks for bicycles are known, which, from the two leg forces (only directed downwards in the simplest case), first produced a torque on a pedal crankshaft and then on a rear wheel hub of the bicycle. The torque on the pedal crankshaft and correspondingly also on the wheel hub (e.g., viewed over a revolution) is uneven.

In this regard, it is known from the state of the art to mount a chain ring on the crankshaft that is oval or elliptical. This is arranged in relation to the two pedal cranks such that when the pedal crank is horizontal, the larger diameter of the chain ring is effective, while when the pedal crank is vertical, the smaller diameter of the chain ring is effective. Thus, from the uneven torque of the crankshaft over the changing chain ring radius, the tractive force on the chain and thus the torque on the rear wheel hub is equalized.

Thus, to equalize the torque on the rear wheel hub, a pedal crank, a front crankshaft, an oval or elliptical chain ring, a chain, a rear sprocket, a rear wheel shaft and/or a wheel hub are provided.

A disadvantage of such bicycle drives with comparable torque is the high technical device cost.

In contrast, the object of the disclosure is to create a crank device or a crank drive in which a non-uniform translational or linear force is converted into a comparative torque. In this context, the technical device cost is to be reduced.

This object is achieved by a crank device or a crank drive with the features set forth below.

Further advantageous embodiments are described below.

SUMMARY

The crank device according to the disclosure or the crank drive according to the disclosure has a crankshaft into which a first variable force can be introduced by means of a transmission element over a first variable lever spacing. The first variable force has a predefined profile and/or predefined change. A profile of the first variable lever spacing is designed in a manner which is dependent on the predefined profile of the first variable force in such a way that an effect of change in the first variable force on the crankshaft is at least partially, preferably completely, compensated for. The compensation according to the disclosure is provided over a rotational range of the crankshaft, which is preferably less than one revolution of the crankshaft.

Preferably, the first force and the first lever spacing are designed such that the greater first force can be introduced with a shorter first lever spacing and the lesser first force can be introduced with a longer first lever spacing. Furthermore, the first force and the first lever spacing are designed such that the decreasing first force can be introduced with an increasing first lever spacing.

Instead of the mentioned crankshaft, only a rotatable hub or a rotatable fastening device for a crankshaft, e.g., a through-recess for a crankshaft, can also be provided.

The aforementioned force is to be understood so that it can also only be a force component of a force, wherein said force component is perpendicular to the radial lever spacing which the force component has to the crankshaft.

Thus, according to the rules of mechanics, the comparative or uniform torque results from the product of the force (component) and the lever spacing.

The technical device cost for the comparison of the torque of a crank device or a crank drive with the bicycle drive of the prior art is thus reduced.

In a preferred application of the disclosure, the first force is a first spring force transmissible from a tensioned first spring of the crank device to the first lever spacing and can be introduced into the crankshaft via the first lever spacing. This spring force decreases as the force is applied and the associated length change of the spring towards an output length.

The increasing first lever spacings are adapted to the spring characteristic such that a torque on the crankshaft is uniform over a relaxation stroke of the spring, and in a particularly preferred embodiment of the disclosure, even constant.

Technically, it is simple when a plurality of (continuously extending) lever spacings of different lengths are formed together on a rotary body fixed to the crankshaft, and the first outer circumference portion of which has a monotonic changing spacing from the crankshaft, wherein the outer ends of the lever spacings are formed on the first outer circumferential portion.

Preferably, a first device for introducing the force of the first force is provided on the first outer circumferential portion of the rotary body.

In an exemplary embodiment of the disclosure, the first force introduction device is a first slack traction mechanism, e.g., a first chain, one end portion of which is coupled to a free end portion of the first spring, and the other end portion of which can rest on the first outer circumferential portion of the rotary body.

In another exemplary embodiment of the disclosure, the first device for force introduction is a first rack guided along a first shift axis and having rack-side teeth spaced at a different distance from the first shift axis, wherein the rack-side teeth are engaged with rotary body-side teeth arranged or formed on the first outer circumferential portion of the rotary body.

In a double further development of the crank device or the crank drive according to the disclosure, a second variable force can also be introduced into the crankshaft via a second variable lever spacing. Analogously to the first force introduction, the second force and the second lever spacing are also designed such that the second greater force can be introduced with a shorter second lever spacing and the second lesser force can be introduced with a longer second lever spacing. Furthermore, the second force and the second lever spacing are designed such that the second decreasing force can be introduced with an increasing second lever spacing. Thus, with the same resulting torque, the two springs can be reduced and the bearing forces of the crankshaft can be reduced.

The two forces mentioned are to be understood so that in each case it can also only be a force component of the force that is perpendicular to the respective radial lever spacing which the force component has to the crankshaft.

Thus, according to the basic rules of mechanics, the comparative or uniform torque results from the product of the force (component) and the lever spacing. In the double further development, the comparative or uniform torque results from the double product of the force (component) and the lever spacing.

In the double further development, the second force is also preferably a spring force, which is transferable from a tensioned second spring of the crank device to the second lever spacing and can be introduced into the crankshaft.

In a particularly simple technical device version of the double further development, the rotary body is point-symmetrical to the crankshaft. The other components mentioned are provided in duplicate and are arranged identically and point-symmetrically to the crankshaft. This results in several common parts and the load of the bearing of the crankshaft is minimal.

In principle, it is also possible to generate desired torque profiles with the device according to the disclosure by designing the spring(s) and the contact sections and to introduce them into the crankshaft.

BRIEF DESCRIPTION OF THE DRAWINGS

A plurality of exemplary embodiments of a crank device according to the present disclosure are shown in the figures.

Shown are.

DETAILED DESCRIPTION

Figure 1A:
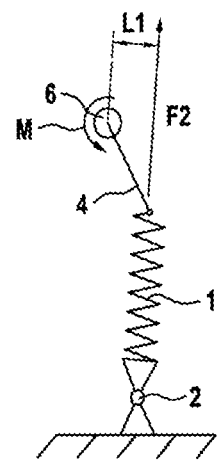
FIGS. 1a and 1b show the crank device according to the disclosure according to a first exemplary embodiment in a schematic representation in two states.
Figure 1B:
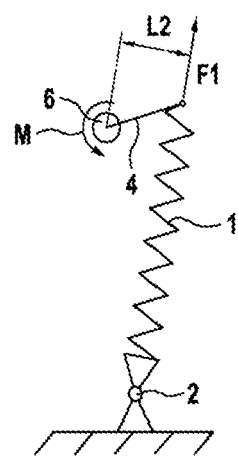

FIG. 1 shows the first exemplary embodiment of the crankshaft drive according to the disclosure in a schematic representation. The crank drive comprises a spring 1, which is configured as a compression spring. In the manner typical for such springs 1, it generates a spring force F1, F2 that depends on its compression. In FIG. 1a, a more compressed state with a greater spring force F2 is shown, while in FIG. 1b, a less compressed state with a lesser spring force F1 is shown.

On the one hand, the spring 1 is clamped and supported via a pivot bearing 2 and, on the other hand, coupled to a lever arm 4 at its end section opposite the pivot bearing 2, to which it transmits its spring force F1, F2. The lever arm 4 can be coupled to a crankshaft 6 in a rotationally fixed manner at its end section opposite the spring 1. The lever arm 4 together with the spring 1 defines a lever spacing L1, L2, which is always the lateral distance that the spring 1 or the spring force F1, F2 has to the crank axis of the crankshaft 6. The spring force F1, F2 or spring 1 and the lever spacing L1, L2 are always exactly perpendicular to each other. This means that the lever spacing L1, L2 only coincides exactly with the lever arm 4 in a special case.

In FIG. 1b, since the spring 1 is even more compressed, it applies a comparatively large spring force F2. This is transferred to the lifting arm 4, which forms an obtuse angle (significantly greater than 90°) with the spring 1. This means that a lever spacing L1 significantly shorter compared to the length of the lifting arm 4 is effective.

In FIG. 1b, the spring 1 is already partially relaxed, thus exerting a lower spring force F1. This is transferred to the lifting arm 4, which forms an acute angle (only slightly less than) 90° with the spring 1. This means that a lever spacing L2 that is only slightly shorter compared to the length of the lifting arm 4 is effective.

So F2>F1 and L2>L1 apply. Spring 1 was selected and clamped such that M=F2*L1=F1*L2 applies. The shown exemplary embodiment of the crank device according to the present disclosure has a constant output torque over a sub-area of the rotation of the output crankshaft 6.

In a variant of the first exemplary embodiment of the crank device shown, which is not shown, the sub-area of rotation of the output crankshaft 6 extends with the continuously constant output torque M from the initial position shown in FIG. 1a to an end position in which the spring 1 and the lever arm 4 exactly form a right angle (90°). The sub-area of rotation of the output crankshaft 6 thus ends with the continuously constant output torque M in the special case in which the lever arm 4 coincides with the lever spacing.

Figure 2A:
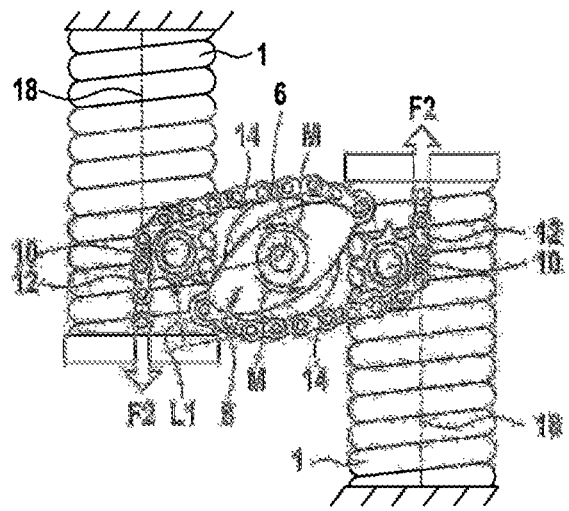
FIGS. 2a and 2b show the crank device according to the disclosure according to a second double exemplary embodiment in two states.
Figure 2B:
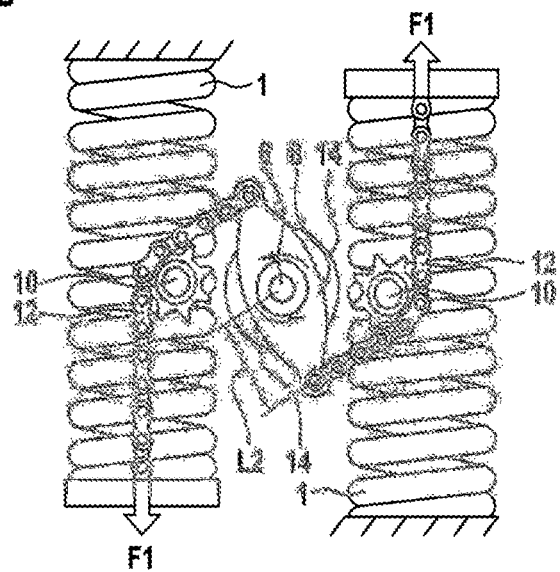

FIGS. 2a and 2b show a double second exemplary embodiment of the crank assembly according to the disclosure. It has two springs 1 parallel to each other and directed against each other as compression springs. Between the directions or axes 18 of the springs 1 is arranged the crankshaft 6, to which a rotary body 8 is connected in a rotationally fixed manner.

A chain 12 is attached to the free end portion of each spring 1, which are attached to the common rotary body 8 via a respective deflection wheel 10. The rotary body 8 is approximately oval or elliptical in shape, with two of the opposite outer circumferential portions 14 serving as contact areas for the respective chain 12.

In FIG. 2a, the two outer circumferential portions 14 are approximately fully in contact with the respective chain 12. In FIG. 2b, the chains 12 are lifted off completely from the respective outer circumferential portion 14.

As the rotary body 8 is approximately oval or elliptical, the distances of the outer circumferential portions 14 to the axis of rotation of the crankshaft 6 continuously change, so that the two variable lever arms L1, L2 are defined in the second exemplary embodiment.

The two springs 1, the two chains 12, the two deflection wheels 10 and the two outer circumferential portions 14 are designed and arranged point-symmetrically to the crank axis of the crankshaft 6.

Figure 3A:
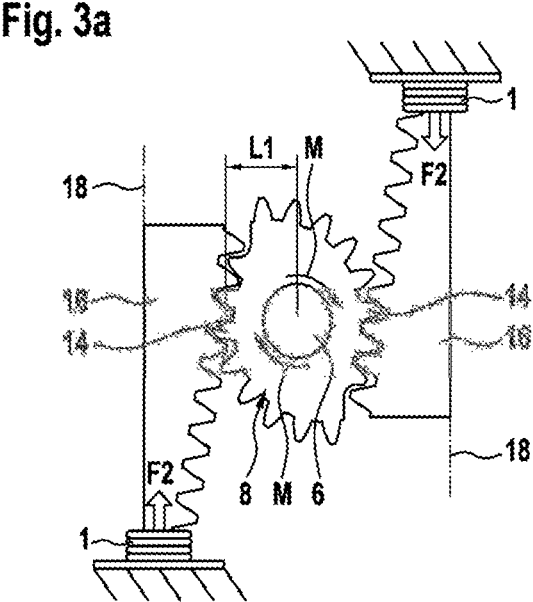
FIGS. 3a and 3b show the crank device according to the disclosure according to a third double exemplary embodiment in two states.
Figure 3B:
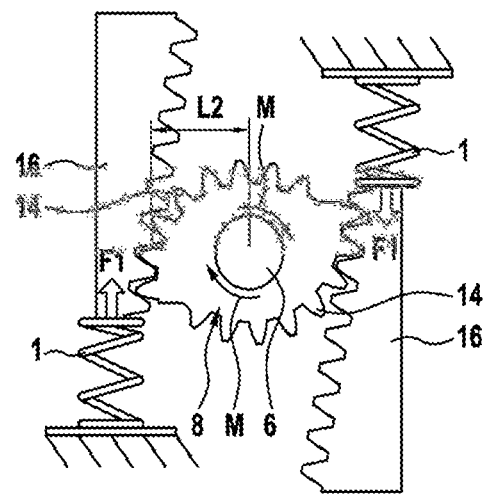

FIGS. 3a and 3b show a double second exemplary embodiment of the crank assembly according to the disclosure. Again, it has two springs 1, which are parallel to each other and are directed oppositely towards each other as compression springs. Between the directions or axes 18 of the springs 1, the crankshaft 6 with the rotating body 8 is again arranged.

A rack 16 is arranged on the free end section of each spring 1. The racks 16 can each be guided along the axis 18 and the force F1, F2 of the springs 1 (in FIGS. 3a and 3b perpendicular). This is done by changing the force F1, F2 of the respective spring 1.

The rotary body 8 is in turn approximately oval or elliptical in shape, wherein two opposing outer circumferential portions 14 have teeth in this exemplary embodiment. The variable distances of the teeth of the outer circumferential portions 14 to the axis of rotation of the crankshaft 6 define the respective variable lever arm L1, L2 in the second exemplary embodiment.

According to this change on the rotary body 8, the respective rack 16 is configured with a variable width. More specifically, the variable spacing of the teeth of rack 16 from axis 18 compensates for the variable radius of rotary body 8 or the variable spacing from its teeth to the rotational axis of crankshaft 6.

The two springs 1, the two racks 16 and the two outer circumferential portions 14 with the teeth are designed and arranged point-symmetrically to the crank axis of the crankshaft 6.

With regard to the second exemplary embodiment from FIGS. 2a and 2b and with regard to the third exemplary embodiment from FIGS. 3a and 3b, F2>F1 and L2>L1 apply. The two springs 1 were selected and clamped in such a way and the two outer circumferential portions 14 were curved such that M=F2*L1=F1*L2 applies. The second exemplary embodiment and the third exemplary embodiment have a constant output torque M over a sub-area of rotation of the output crankshaft 6. The sub-area of rotation extends from the respective tensioned state shown in Figure a to the relaxed state of the two springs 1 shown in the respective Figure b.

Figure 4A:
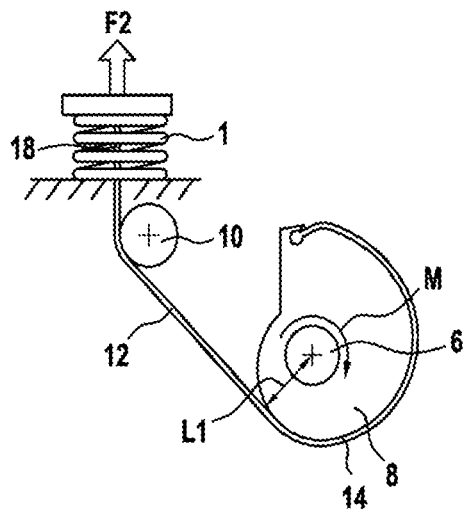
FIGS. 4a and 4b show the crank device according to the disclosure according to a fourth exemplary embodiment in two states.
Figure 4B:
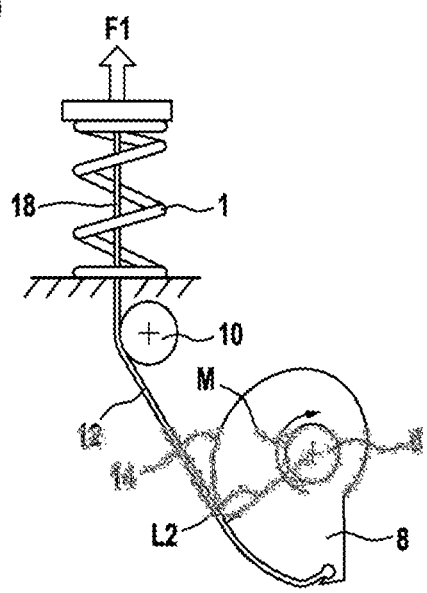

FIGS. 4a and 4b show a fourth exemplary embodiment of the crank assembly according to the disclosure. It has a spring 1 configured as a compression spring. The crankshaft 6 is arranged at a distance to the direction or axis 18 of the spring 1, and a rotary body 8 is connected to it in a rotationally fixed manner. On the free end section of the spring 1, a slack traction mechanism 12, which is formed as a cable or wire, is attached to the rotary body 8 via a deflector wheel 10. The rotary body 8 is a cam disc with an outer circumferential portion 14, which serves as a contact area for the traction mechanism 12.

In FIG. 4a, the outer circumferential portion 14 is approximately fully in contact with the traction mechanism 12. In FIG. 4b, the traction mechanism 12 is largely lifted off the outer circumferential portion 14.

Due to the shape of the rotating body 8, the distance of the outer circumferential portion 14 to the axis of rotation of the crankshaft 6 continuously changes, so that the two variable lever arms L1, L2 are defined in the fourth exemplary embodiment.

With regard to the fourth exemplary embodiment of FIGS. 4a and 4b, therefore, F2>F1 and L2>L1 apply. The spring 1 was selected and clamped in such a way and the two outer circumferential portions 14 were curved such that M=F2*L1=F1*L2 applies. The fourth exemplary embodiment has a constant output torque M over a sub-area of rotation of the output crankshaft 6. The sub-area of rotation extends at least from the tensioned state shown in FIG. 4a to the substantially relaxed state of the spring 1 shown in FIG. 4b.

LIST OF REFERENCE SIGNS

1 Spring
2 Pivot bearing
4 Lever
6 Crankshaft
8 Rotary body
10 Deflection wheel
12 Slack traction mechanism/chain
14 Outer circumferential portion
16 Rack
18 Axis
L1 Shorter first lever spacing/shorter second lever spacing
L2 Longer first lever spacing/longer second lever spacing
F1 Weaker first force/weaker second force
F2 Stronger first force/stronger second force
M Torque

The invention claimed is:

1. A crank device, comprising:
a crankshaft; and
a transmission element configured to introduce into the crankshaft a first variable force by way of a first variable lever spacing,
wherein
the first variable force has a predefined profile,
a profile of the first variable lever spacing is dependent on the predefined profile of the first variable force such that an effect of change in the first variable force on the crankshaft is at least partially compensated,
the transmission element comprises a rotary body, the transmission element is fixed to the crankshaft, a first outer circumferential portion of the rotary body has a first monotonic changing spacing from the crankshaft, and the first monotonic changing spacing defines the first variable lever spacing,
the transmission element is configured to introduce a second variable force into the crankshaft via a second variable lever spacing,
a second outer circumferential portion of the rotary body has a second monotonic changing spacing from the crankshaft, and the second monotonic changing spacing defines the second variable lever spacing, and
the first and second outer circumferential portions of the rotary body are point-symmetrical to the crankshaft.

2. The crank device according to claim 1, wherein the crank device is configured such that:
a first force is introduced with a first lever spacing of the first variable lever spacing,
a second force is introduced with a second lever spacing of the first variable lever spacing,
the first lever spacing is greater than the second lever spacing, and
the first force is less than the second force.

3. The crank device according to claim 1, further comprising a first spring, wherein the first variable force is a variable spring force that is introduced by the first spring to the crankshaft via the first variable lever spacing.

4. The crank device according to claim 3, wherein the first variable lever spacings is adapted to the first spring such that a torque applied by the first spring to the crankshaft through the first variable lever spacing is constant over a relaxation stroke of the first spring.

5. The crank device according to claim 3, wherein a first device configured to introduce the first variable force to the transmission element is positioned on the first outer circumferential portion of the rotary body.

6. The crank device according to claim 5, wherein the first device is a slack traction mechanism, one end section of which is coupled to a free end section of the first spring, and the other end section of which is configured to rest against the first outer circumferential portion of the rotary body.

7. The crank device according to claim 5, wherein:
the first device is a rack guided along an axis and its rack-side teeth have a different spacing from the axis, and
the rack-side teeth engage with rotating body-side teeth arranged on the first outer circumferential portion of the rotary body.

8. The crank device according to claim 1, wherein the crank device is configured such that:
- a third force is introduced with a third lever spacing of the second variable lever spacing,
- a fourth force is introduced at a fourth lever spacing of the second variable lever spacing,
- the third lever spacing is greater than the fourth lever spacing, and
- the third force is less than the fourth force.

9. The crank device according to claim 8, wherein the second variable force is a variable spring force that is introduced by a second spring to the crankshaft through the second variable lever spacing.

\* \* \* \* \*

UNITED STATES PATENT AND TRADEMARK OFFICE
CERTIFICATE OF CORRECTION

PATENT NO. : 12,196,294 B2
APPLICATION NO. : 18/263775
DATED : January 14, 2025
INVENTOR(S) : Schneider et al.

It is certified that error appears in the above-identified patent and that said Letters Patent is hereby corrected as shown below:

In the Claims

In Claim 4, at Column 6, Line 48: "the first variable lever spacings is adapted" should read --the first variable lever spacing is adapted--.

Signed and Sealed this
First Day of July, 2025

Coke Morgan Stewart
*Acting Director of the United States Patent and Trademark Office*